US011302218B2

(12) United States Patent
Kim et al.

(10) Patent No.: US 11,302,218 B2
(45) Date of Patent: Apr. 12, 2022

(54) CONSTRUCTION TEACHING SET FOR EDUCATION

(71) Applicants: Bu Sung Kim, Daegu (KR); Su Jin Park, Daegu (KR)

(72) Inventors: Bu Sung Kim, Daegu (KR); Su Jin Park, Daegu (KR)

( * ) Notice: Subject to any disclaimer, the term of this patent is extended or adjusted under 35 U.S.C. 154(b) by 377 days.

(21) Appl. No.: 16/307,934

(22) PCT Filed: Nov. 20, 2017

(86) PCT No.: PCT/KR2017/013167
§ 371 (c)(1),
(2) Date: Dec. 6, 2018

(87) PCT Pub. No.: WO2018/105922
PCT Pub. Date: Jun. 14, 2018

(65) Prior Publication Data
US 2019/0266920 A1     Aug. 29, 2019

(30) Foreign Application Priority Data

Dec. 5, 2016 (KR) .......................... 10-2016-0164570

(51) Int. Cl.
*G09B 23/26* (2006.01)
*A63H 33/08* (2006.01)
(Continued)

(52) U.S. Cl.
CPC ............. *G09B 23/26* (2013.01); *A63H 33/06* (2013.01); *A63H 33/08* (2013.01); *G09B 1/36* (2013.01);
(Continued)

(58) Field of Classification Search
CPC ..... A63H 33/06; A63H 33/062; A63H 33/065; A63H 33/067; A63H 33/08;
(Continued)

(56) References Cited

U.S. PATENT DOCUMENTS 2,504,650 A * 4/1950 Chessrown ............ A63B 43/00
434/172
3,982,841 A * 9/1976 Endzweig ............. E04B 1/1906
403/19
(Continued)

FOREIGN PATENT DOCUMENTS

| KR | 100559439 B1 | 3/2006 |
| KR | 20100004725 U | 5/2010 |

(Continued)

*Primary Examiner* — Joseph B Baldori
(74) *Attorney, Agent, or Firm* — Bayramoglu Law Offices LLC

(57) ABSTRACT

A construction teaching set for education. A polyhedral block body has first and second divided members and provided by engaging and assembling of the first and second divided members. Each of the first and second divided members has a rectangular plane, a plurality of rectangular inclined surfaces adjoining sides of the rectangular plane, triangular connectors formed between the adjacent rectangular inclined surfaces, and a plurality of vertical skirts extending from the plurality of rectangular inclined surfaces and the triangular connectors. A connection bar has a protruding fastener at one end or both ends to be selectively connected to one among a first fastening hole passing through the rectangular plane, second fastening holes passing through the plurality of rectangular inclined surfaces, and third fastening holes formed in a pair of the vertical skirts adjoining each other. A coupling unit generates coupling force for the first and second divided members.

10 Claims, 16 Drawing Sheets

(51) Int. Cl.
*G09B 23/24* (2006.01)
*G09B 19/00* (2006.01)
*G09B 23/04* (2006.01)
*A63H 33/06* (2006.01)
*G09B 1/36* (2006.01)

(52) U.S. Cl.
CPC .............. *G09B 19/00* (2013.01); *G09B 23/04* (2013.01); *G09B 23/24* (2013.01)

(58) Field of Classification Search
CPC .... A63H 33/086; A63H 33/088; G09B 19/00; G09B 1/36; G09B 23/04; G09B 23/10; G09B 23/20; G09B 23/24; G09B 23/26
USPC ........ 434/277, 278, 281; 446/107, 122, 123, 446/126, 128
See application file for complete search history.

(56) References Cited

U.S. PATENT DOCUMENTS

| | | | | |
|---|---|---|---|---|
| 4,129,975 A | * | 12/1978 | Gabriel | A63H 33/101 52/655.2 |
| 4,763,459 A | * | 8/1988 | Wesselski | B64G 9/00 403/171 |
| 4,781,644 A | * | 11/1988 | Yoshida | F16B 35/047 446/123 |
| 4,822,199 A | * | 4/1989 | Nehls | E04B 1/1906 403/171 |
| 4,927,287 A | * | 5/1990 | Ohkawa | F16B 21/086 24/297 |
| 5,487,691 A | * | 1/1996 | Chiu | A63H 33/10 446/102 |
| 5,542,871 A | * | 8/1996 | Gabriel | A63H 33/101 24/615 |
| 6,540,580 B1 | * | 4/2003 | Wolfram | A63H 1/30 446/250 |
| 6,966,813 B2 | * | 11/2005 | Donahue | A63H 33/067 403/217 |
| 7,276,270 B2 | * | 10/2007 | Vicentelli | A47F 5/14 248/309.4 |
| 7,364,487 B2 | * | 4/2008 | Evans | A63H 33/008 446/108 |
| 9,345,983 B2 | * | 5/2016 | Meys | A63H 33/10 |
| 2006/0084357 A1 | * | 4/2006 | Rosen | A63H 33/107 446/91 |
| 2006/0128257 A1 | * | 6/2006 | Aggar | A63H 33/062 446/122 |
| 2015/0017624 A1 | * | 1/2015 | Drapela | G09B 23/26 434/278 |
| 2019/0143237 A1 | * | 5/2019 | De Wilde | A63H 17/262 446/122 |

FOREIGN PATENT DOCUMENTS

| | | |
|---|---|---|
| KR | 20120035058 A | 4/2012 |
| KR | 101327597 B1 | 11/2013 |
| KR | 101447679 B1 | 10/2014 |
| KR | 20160128798 A | 11/2016 |

* cited by examiner

CONSTRUCTION TEACHING SET FOR EDUCATION

CROSS REFERENCE TO THE RELATED APPLICATIONS

This application is the national phase entry of International Application No. PCT/KR2017/013167, filed on Nov. 20, 2017, which is based upon and claims priority to Korean Patent Application No. 10-2016-0164570, filed on Dec. 5, 2016 and the Korean Patent Application No. 10-2017-0153949 filed on Nov. 17, 2017, the entire contents of which are incorporated herein by reference.

TECHNICAL FIELD

The present invention relates to an educational construction set that can be constructed into various shapes of three-dimensional (3D) structures for understanding and education of 3D structures.

BACKGROUND

In general, in kindergartens, elementary schools, middle schools, and high schools, educational tools are widely used in learning in order to improve the understanding by students of diagrams or figures.

Such educational tools can be assembled into the shape of a three-dimensional (3D) structure in a variety of shapes, so that a chemical structural formula or a 3D structure, the configuration of which is difficult to understand, can be easily assembled and realized.

Accordingly, in learning using an educational tool, a teacher conducts a class while showing a process of assembling the educational tool or showing an assembled educational construction set to the other students.

However, in the case of related art educational tools, each educational unit is assembled in a single direction, and the educational unit has a significant volume. It is therefore difficult to assemble the educational unit into a figure comprised of a plurality of figures. In addition, improvement in an educational effect for a better understanding of a 3D structure is limited.

(Patent Document 1) KR10-1327597 B1

Patent Document 1 discloses an educational tool that can be played with and freely assembled into a diagram having an intended size or shape. This can promote development in intelligence, improve interest in mathematics, and improve learning ability. In addition, the educational tool can prevent accidents that would occur when the educational tool is swallowed by infants or children.

However, in the educational tool of the related art, connecting members located on vertices of a figure are made of a metal, and a tool unit coupled to the connecting members is made of a magnet. Thus, the educational tool must be assembled into a figure using attractive force between the metal and the magnet. Accordingly, there are the following problems. The metal and the magnet used increases the manufacturing cost of the educational tool of the related art. It is difficult to assemble and realize a 3D structure having a variety of shapes and a complicated configuration using the educational tool of the related art. The ability of the educational tool of the related art to maximize the educational effect is limited.

In addition, since coupling between the connecting members and the tool unit is simply maintained by attractive force between the metal and the magnet, the assembled 3D structure may be fractured or disassembled by an external impact. It is difficult to move or handle the assembled 3D structure, which is problematic.

SUMMARY

Accordingly, the present invention has been made keeping in mind the above problems occurring in the prior art, and an object of the present invention is to provide an educational construction set that can be constructed into not only a variety of figures and chemical structural formulas necessary for learning and education of various 3D structures, but also various shapes of three-dimensional (3D) structures that can be seen in real life, and can guarantee the endurance of an assembled 3D structure, such that the educational construction set can be simply moved and handled and reliably maintain a shape.

The object of the present invention is not limited to the aforementioned description, and other objects not explicitly disclosed herein will be clearly understood by those skilled in the art to which the present invention pertains from the description provided hereinafter.

According to a specific aspect for accomplishing the above object, a first embodiment according to the present invention provides an educational construction set including: a polyhedral block module including a first section member and a second section member and configured to be assembled by fitting of the first section member and the second section member, wherein each of the first and second section members includes a quadrangular plane, a plurality of quadrangular slopes adjoining sides of the quadrangular plane, triangular connectors provided between adjacent quadrangular slopes among the plurality of quadrangular slopes, and a plurality of vertical skirts extending from predetermined sides of the triangular connectors; a connecting rod having a predetermined length, and including a locking projection provided on one or opposite ends thereof, the locking projection being selectively locked to one locking-hole among a first locking-hole penetrating through the quadrangular plane, second locking-holes penetrating through the plurality of quadrangular slopes, and third locking-holes respectively provided in a pair of adjoining vertical skirts among the plurality of vertical skirts, wherein the connecting rod is connected to the polyhedral block module or is connected between the adjacent polyhedral block modules; and a coupling unit generating coupling force by which the first section member and the second section member are coupled to each other, so that the polyhedral block module remains in an assembled position.

In the educational construction set, each of the triangular connectors may be provided between the adjacent quadrangular slopes among the plurality of quadrangular slopes, and may include a pair of left and right vertical triangular walls and a horizontal triangular wall connecting the vertical triangular walls.

Each of the triangular connectors may include a triangular slope extending from and connecting the adjacent quadrangular slopes.

One locking hole among the first, second, and third locking-holes may have a circular hole and a pair of extension holes extending in opposite directions from the circular hole. The locking projection may include a circular column and projections protruding in opposite directions from the circular column to be correspondingly inserted into the circular hole and the extension-holes, the projections intersecting the extension-holes when the connecting rod is rotated.

The third locking-holes may be completed when open portions provided in predetermined peripheral portions of the vertical skirts, corresponding to a fitting joint of the first and second section members, are connected to each other.

Each of the first and second section members may include first and second reinforcement ribs extending from inner surfaces of the triangular connectors to a fitting joint of the first and second section members.

More particularly, each of the first and second section members may further include a third reinforcement rib extending from a corner at which the first and second reinforcement ribs adjoin each other, the third reinforcement rib adjoining an inner surface of the quadrangular plane.

More particularly, each of the first and second section members may further include a fitting member having a locking-hole penetrating through the fitting member, such that ends of the first and second reinforcement ribs or ends of the first to third reinforcement ribs are correspondingly inserted into the locking-hole. The first and second reinforcement ribs may include first and second open portions allowing the fitting member to be fitted around the first and second reinforcement ribs without interference.

The coupling unit may include a plurality of coupling recesses extending from the quadrangular slopes to the vertical skirts, in positions corresponding to the triangular connectors, the plurality of coupling recesses respectively having an inner flange defining a bottom, and coupling members coupled to the coupling recesses through coupling-holes penetrating through pairs of the inner flanges, which adjoin each other at a fitting joint when the first and second section members are fitted to each other.

The coupling unit may include a plurality of bosses extending a predetermined height from inner surfaces of the triangular connectors provided in the first section member and receptacles provided on inner surfaces of the triangular connectors provided in the second section member, such that ends of the bosses are correspondingly inserted into and coupled to the receptacles.

In addition, according to another embodiment of the present invention, provided is an educational construction set including: a spherical block module including a first section member and a second section member and configured to be assembled by fitting of the first section member and the second section member facing each other, wherein each of the first and second section members has a first locking-hole penetrating through a vertex, a plurality of open portions provided an outwardly-opened outer circumference, a plurality of second locking-holes penetrating through outer portions between the first locking-hole and the open portions; a connecting rod having a predetermined length, and including a locking projection on one or opposite ends thereof, the locking projection being selectively locked to one locking-hole among the first locking-hole, the second locking-holes, and third locking-holes defined by connection of the open portions facing each other, wherein the connecting rod is connected to the spherical block module or is connected between the adjacent spherical block modules; and a coupling unit generating coupling force by which the first section member and the second section member are coupled to each other, so that the spherical block module remains in an assembled position.

In the educational construction set, one locking-hole among the first locking-hole, the second locking-holes, and the third locking-holes may include a circular-hole and a pair of extension-holes extending in opposite directions from the circular-hole. The locking projection may include a pair of locking pieces respectively having a hook protruding from an outer surface of a front end thereof, the hook being inserted into the circular-hole to be elastically locked to an inner portion of the circular-hole, and a locking plate provided between the pair of locking pieces to be correspondingly inserted through the pair of extension-holes, the locking plate being locked to an inner portion of the circular-hole when the connecting bar is rotated.

More particularly, a stopper may be provided on an inner surface of the spherical block module in which the circular-hole is provided. The stopper adjoins the locking plate to limit rotation of the connecting rod when the connecting rod is rotated.

The connecting rod may include a coupling body, with the locking projection being provided on one end of the coupling body to be selectively locked to one locking-hole among the first to third locking-holes, and a connecting body, one or opposite ends of which are separably fitted to extensions extending from the other ends of the coupling bodies.

More particularly, each of the extensions may extend a predetermined length, with an outer diameter smaller than an outer diameter of the coupling body. The connecting body may be interference-fitted around the extension, due to at least one embossed portion protruding from an outer surface of the extension.

The coupling unit may include tubular coupling bodies extending a predetermined length from inner surfaces of the first and second section members, corresponding to the first locking-holes, in which first coupling projections protruding from ends of the tubular coupling bodies in one section member of the first and second section members facing each other are correspondingly coupled to first coupling recesses depressed in the tubular coupling bodies in the other section member of the first and second section members facing each other when the first and second section members are fitted to each other.

More particularly, the first coupling projections may include coupling plates extending the predetermined height from one end of the predetermined height. The first coupling recesses may include grooves depressed in inner surfaces of the tubular coupling bodies to adjoin outer surfaces of the coupling plates.

The coupling unit may include second coupling projections protruding from the outer circumferences of the first and second section members and second coupling recesses depressed in the outer circumferences of the first and second section members, corresponding to the adjacent open portions, the second coupling projections provided on predetermined portions of the outer circumferences being correspondingly coupled to the second coupling recesses provided on the other portions of the outer circumferences.

Each of the second coupling projections may include an elastic piece having an externally-protruding hook on one end thereof. Each of the second coupling recesses may include a through-hole penetrating through an outer surface of either the first or second section member, such that the hook is elastically locked thereto.

More particularly, reinforcement ribs may be provided on inner surfaces of the first and second section members, corresponding to the second coupling projections or the second coupling recesses, to reinforce portions of the outer circumferences alternating with the adjacent open portions.

Advantageous Effects

The present invention as set forth above has the following effects.

1) Spherical block modules or polyhedral block modules, each of which is assembled by fitting first and second section members to each other, are connected to each other using connecting rods as intervening elements, such that not only a variety of 3D figures and chemical structural formulas, but also various shapes of 3D structures, can be realized. It is accordingly possible to improve the creativity and stereoscopic sensation of a user and improve the understanding of 3D structures by the user, thereby improving a stereoscopic educational effect.

2) Coupling force between the first and second section members in the central portion or the fitting portion of the spherical block module or the polyhedral block module can be improved, and connecting and coupling force to the connecting rod can be improved due to locking connection between a locking projection and first, second, and third fitting spaces, thereby guaranteeing the endurance of an assembled 3D structure. Accordingly, the assembled 3D structure, can reliably maintain the shape while being moved or handled, thereby improving user satisfaction.

3) A user can assemble a skeletal 3D structure, with which spatial playing can be conducted, by connecting the spherical block module or polyhedral block module and the connecting bar. It is possible to create a separate playing space by wrapping the skeletal 3D structure with an outer cover. Depending on the shape of the assembled 3D structure, a variety of structures, such as an igloo, a ball pull, a football goal post, an outdoor ride, can be provided.

BRIEF DESCRIPTION OF THE DRAWINGS

FIG. 12 shows configuration views illustrating positions in which the spherical block module and the connecting bar are connected in the educational construction set according to the second embodiment of the present invention, in which:

DETAILED DESCRIPTION OF THE EMBODIMENTS

Figure 1:
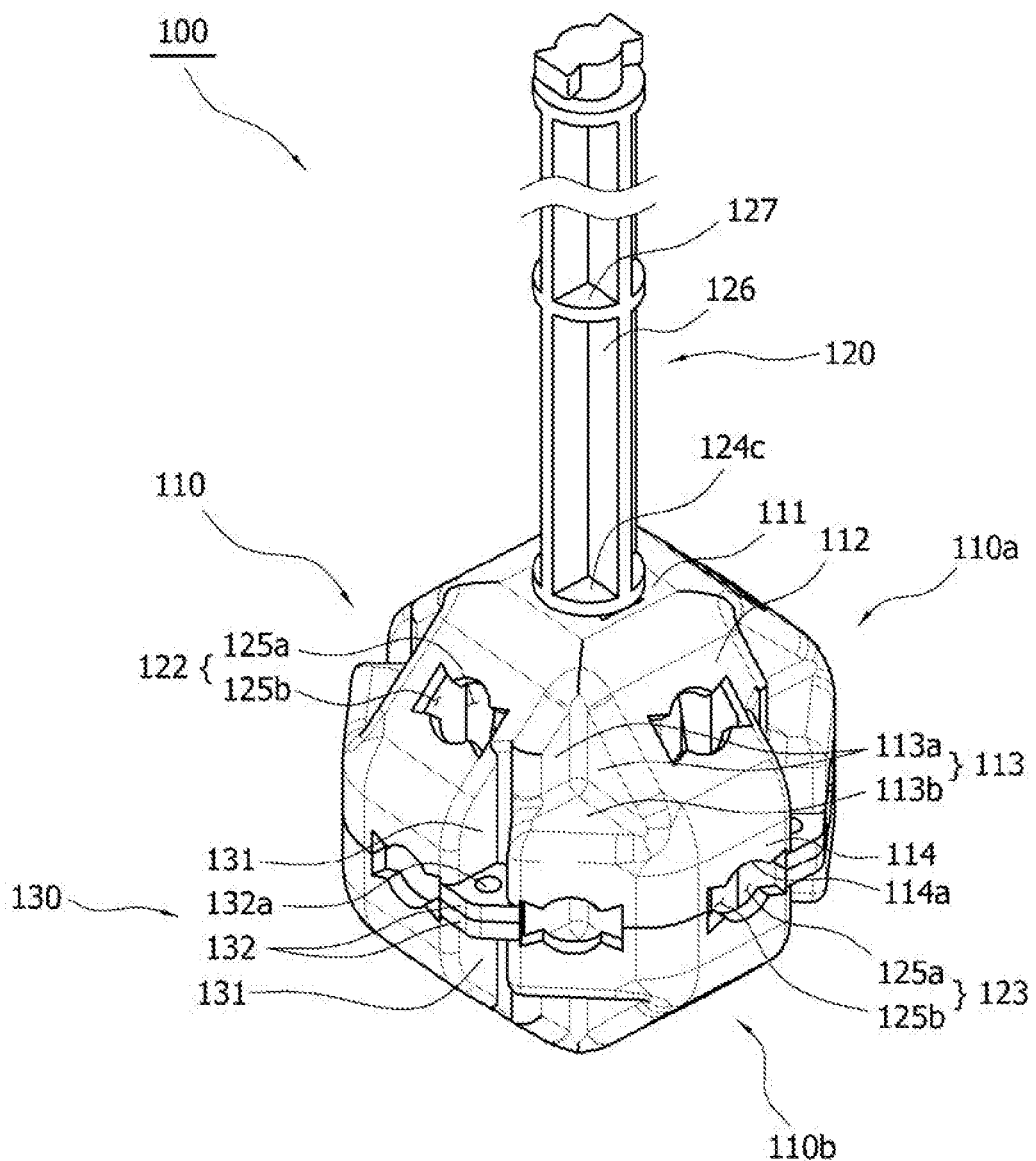
FIG. 1 is an overall perspective view illustrating an educational construction set according to a first embodiment of the present invention.

Hereinafter, exemplary embodiments will be described in detail with reference to the accompanying drawings, so that those skilled in the art to which the present invention relates could easily put the present invention into practice. In the following detailed description of the principle of exemplary embodiments, detailed descriptions of known functions and components incorporated in the present invention will be omitted in the case in which the subject matter of the present invention is rendered unclear by the inclusion thereof.

Throughout the drawings, the same reference numerals and symbols will be used to designate the components having the same or similar functions or actions.

Throughout the specification, it will be understood that when an element is referred to as being "connected to" another element, not only can it be "directly connected to" the other element, but it can also be "indirectly connected to" the other element via an "intervening" element. It will be understood that the terms "comprise," "include," "have," and any variations thereof used herein are intended to cover non-exclusive inclusions unless explicitly described to the contrary.

As illustrated in FIG. 1, an educational construction set 100 according to a first embodiment of the present invention may include a polyhedral block module 110, a connecting rod 120, and coupling units 130. The educational construction set 100 is configured to realize a three-dimensional (3D) structure, such as a chemical structural formula or a skeletal structure, in order to improve an educational effect.

Figure 2:
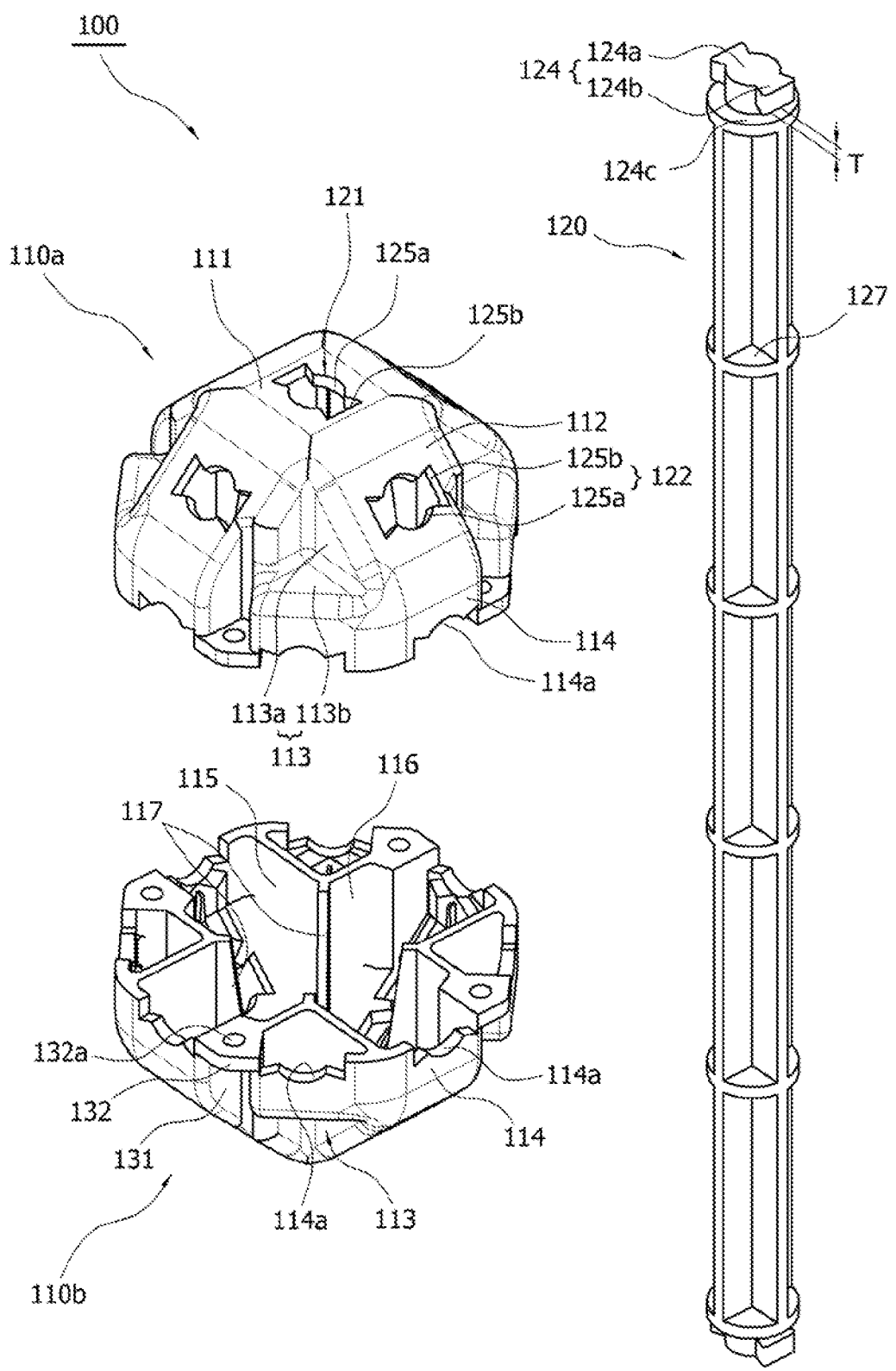
FIG. 2 is an exploded perspective view illustrating the educational construction set according to the first embodiment of the present invention.
Figure 3:
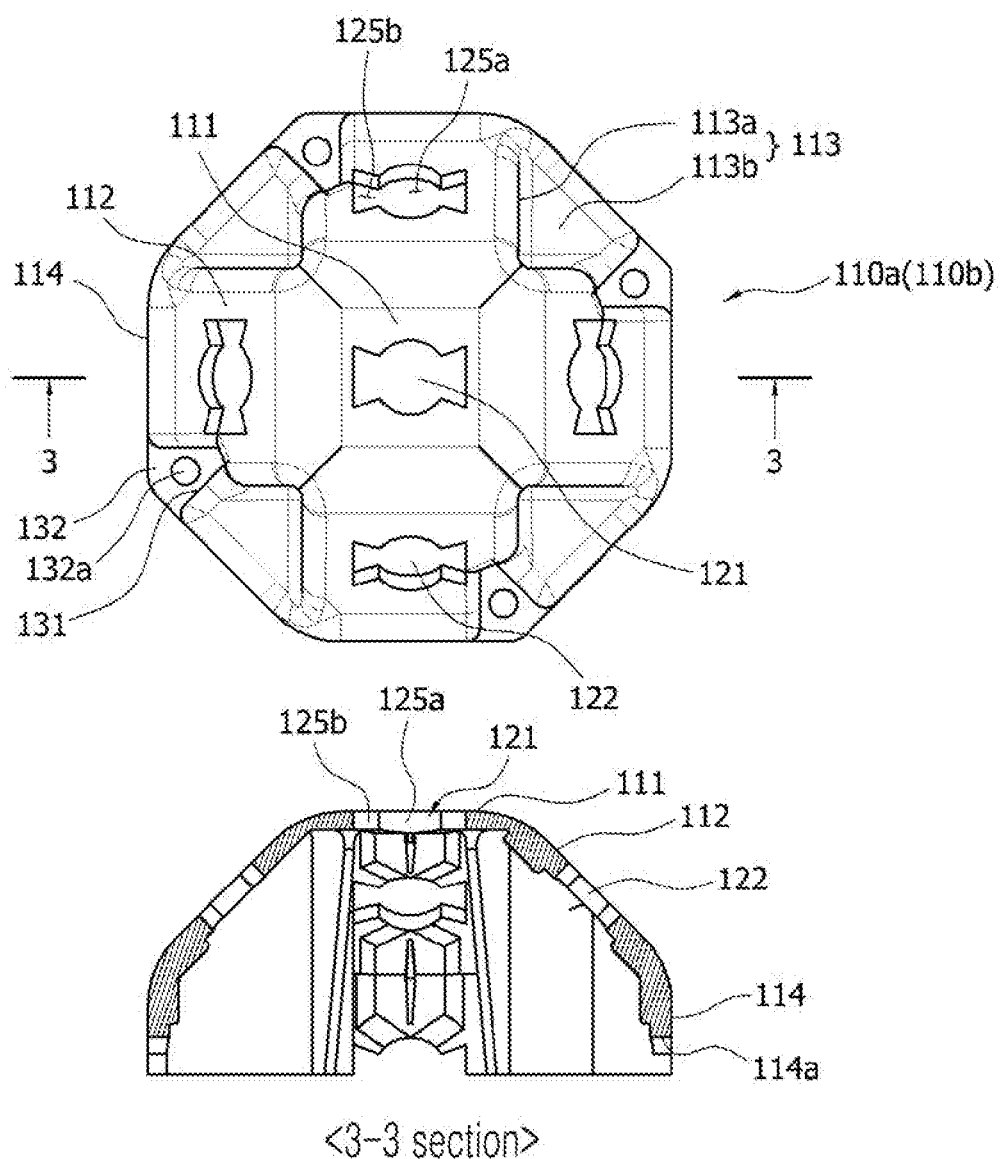
FIG. 3 is a configuration view illustrating the first and second section members of the educational construction set according to the first embodiment of the present invention.

As illustrated in FIGS. 1 to 3, the polyhedral block module 110 includes a first section member 110*a* and a second section member 110*b*, which are configured to be laterally or vertically symmetrical with respect to a fitting joint. The polyhedral block module 110 may be assembled into a polyhedral block structure, in response to the first and second section members being fitted to each other.

Each of the first and second section members 110*a* and 110*b* has a quadrangular plane 111 having a quadrangular shape to form a top or bottom surface of the polyhedral block module and a plurality of quadrangular slopes 112 adjoining four sides of the quadrangular plane. The plurality of quadrangular slopes 112 is inclined at a predetermined angle, preferably at 45°, with respect to the quadrangular plane.

The quadrangular slopes 112 respectively having a quadrangular shape like the quadrangular plane 111 are radially connected via triangular connectors 113. The triangular connectors 113 may be substantially triangular slopes respectively provided between the adjacent quadrangular slopes 112.

Figure 5:
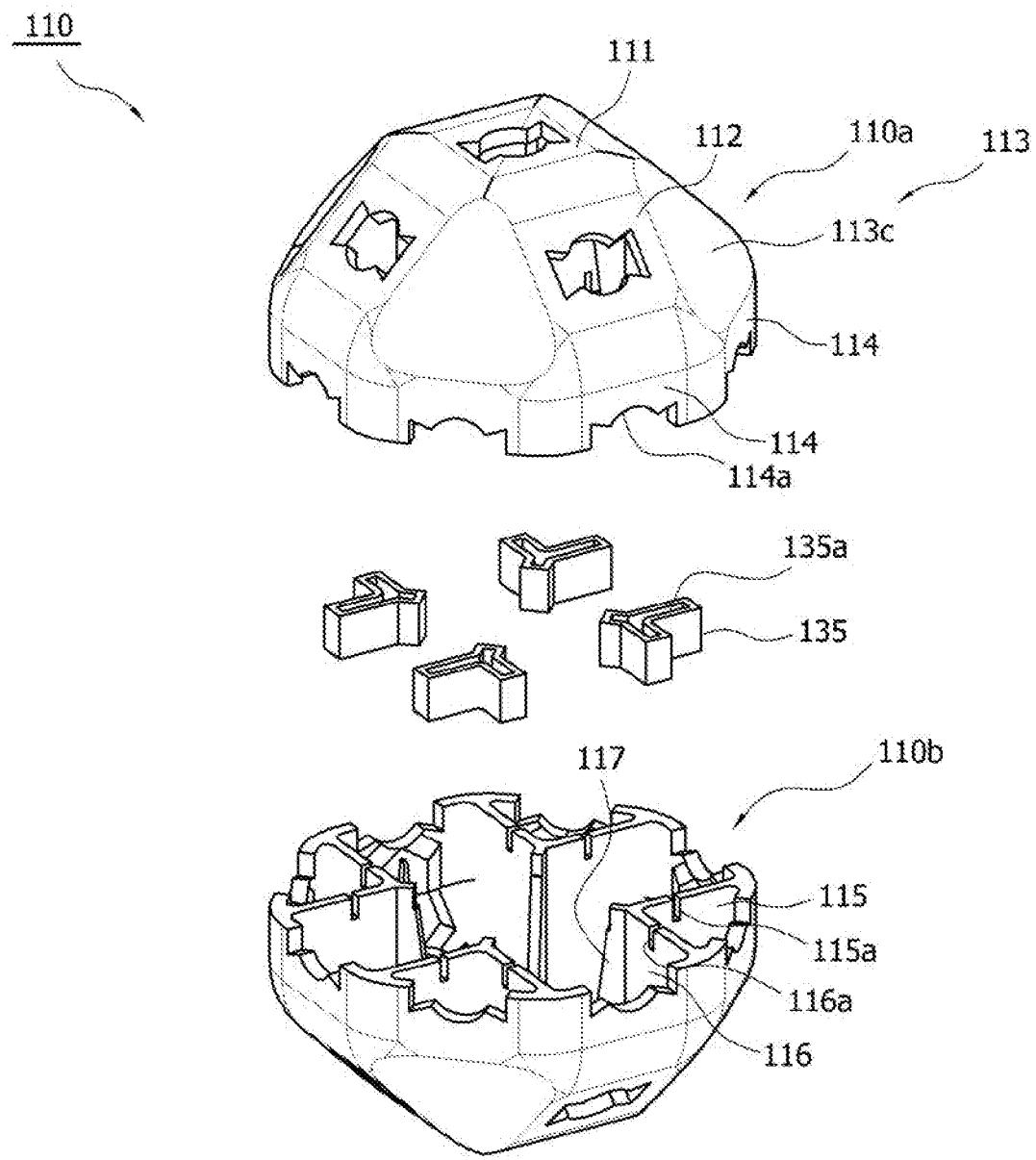
FIG. 5 is a configuration view illustrating fitting members employed in the educational construction set according to the first embodiment of the present invention.

Here, each of the triangular connectors 113 is illustrated and described as being provided between the adjacent quadrangular slopes 112 to be depressed in the shape of a triangular pyramid, and including a pair of left and right vertical triangular walls 113a and a horizontal triangular wall 113b connecting the vertical triangular walls 113a to form a bottom surface therebetween. However, the triangular connectors 113 are not limited thereto. As illustrated in FIG. 5, the triangular connectors 113 may be provided with triangular slopes 113c extending from and connecting the adjacent quadrangular slopes 112.

In this case, the internal strength of the first and second section members can be increased by the pair of vertical triangular walls 113a and the horizontal triangular wall 113b, thereby improving the endurance of the polyhedral block module 110, which is assembled, with the components thereof being fitted together.

In addition, open entrances of the triangular connectors are covered and closed with the triangular slopes 113c. This can essentially prevent impurities from being caught or accumulating, thereby maintaining a clean state.

The four quadrangular slopes 112 are circumferentially provided around the quadrangular plane 111 at angles of about 90°. Each of the first and second section members 110a and 110b may include a plurality of vertical skirts 114 substantially vertically extending from predetermined sides of the four quadrangular slopes 112 and predetermined sides of the triangular connectors 113 each connecting the adjacent quadrangular slopes 112.

When the first and second section members are fitted together into an assembly, the plurality of vertical skirts 114 are fitted to each other to be perpendicular to the quadrangular plane, thereby providing substantially vertical eight outer surfaces on the outer portions of the polyhedral block module.

Here, when the first and second section members 110a and 110b are fitted together, a pair of vertical skirts 114, which vertically or laterally adjoin each other, may preferably form third locking-holes 123 and have the shape of a quadrangle having the same area as each quadrangular plane of the first and second section members.

In addition, each of the first and second section members 110a and 110b may include first and second reinforcement ribs 115 and 116 extending predetermined heights from the internal surfaces of the triangular connectors 113 to the fitting joint in order to increase the internal strength of the polyhedral block module, which is assembled when the components thereof are fitted together.

Here, third reinforcement ribs 117 may be provided at corners, in which the first and second reinforcement ribs 115 and 116 adjoin each other, so as to extend to adjoin the inner surface of the quadrangular plane 111.

When the first and second section members are fitted together, respective ends of the first, second, and third reinforcement ribs 115, 116, and 117 adjoin each other to form the internal skeleton of the assembled polyhedral block module 110.

Accordingly, the internal strength of the assembled polyhedral block module can be increased using the first, second, and third reinforcement ribs, thereby improving endurance while preventing external impact-induced fracture.

Figure 4:
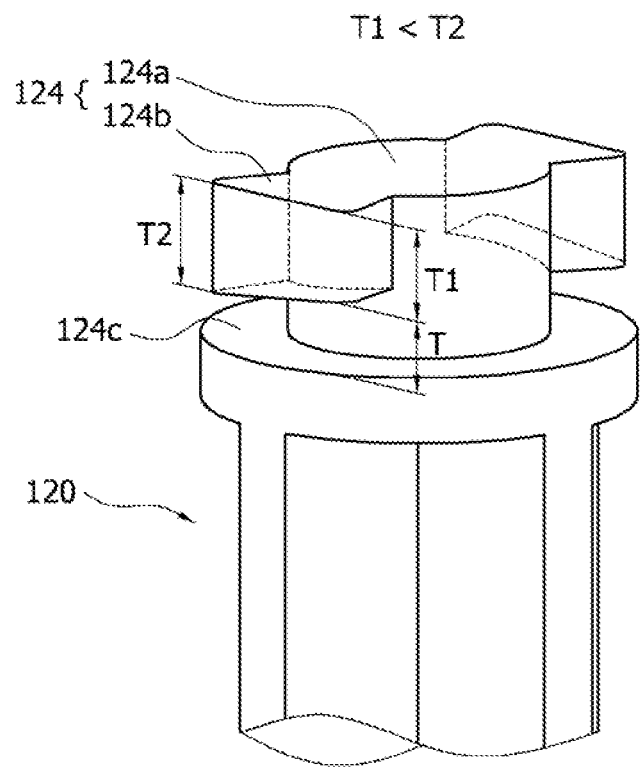
FIG. 4 is a configuration view illustrating the connecting rod of the educational construction set according to the first embodiment of the present invention.

As illustrated in FIGS. 1, 3, and 4, the connecting rod 120 may be implemented as a connecting bar member extending a predetermined length. The connecting rod 120 has a locking projection 124 on one end or on each of opposite ends thereof, configured to be selectively locked to one of first locking-holes 121 penetrating through the central areas of the central area of the quadrangular planes 111, second locking-holes 122 penetrating through the central areas of the central area of the plurality of quadrangular slopes 112, and third locking-holes 123 defined when a pair of vertical skirts 114, adjoining each other, is fitted together. One end of the connecting rod 120 may be connected to the polyhedral block module 110, or the connecting rod 120 may connect adjacent polyhedral block modules 110.

Here, each of the first, second, and third locking-holes 121, 122, and 123 may include a circular-hole 125a and a pair of extension-holes 125b extending in opposite directions from the circular-hole 125a. The locking projection 124 may include a circular column 124a and projections 124b protruding in opposite directions from the circular column 124a to be correspondingly inserted into the circular-hole and the extension-holes.

In this case, when the circular column correspondingly inserted into the circular-hole rotates, the projections intersect the locking-holes substantially in the shape of a cross, so that the locking projections are locked to the locking-holes.

Here, the projections 124b are spaced apart predetermined distances T from a terminal surface 124c of the connecting rod, from which the circular column extends. Accordingly, when the projections correspondingly inserted into the extension holes 125b are rotated about 90°, a locking connection may be established within the circular-hole, thereby generating locking force between the locking projection 124 and one of the first to third locking-holes 121, 122, and 123.

Figure 7:
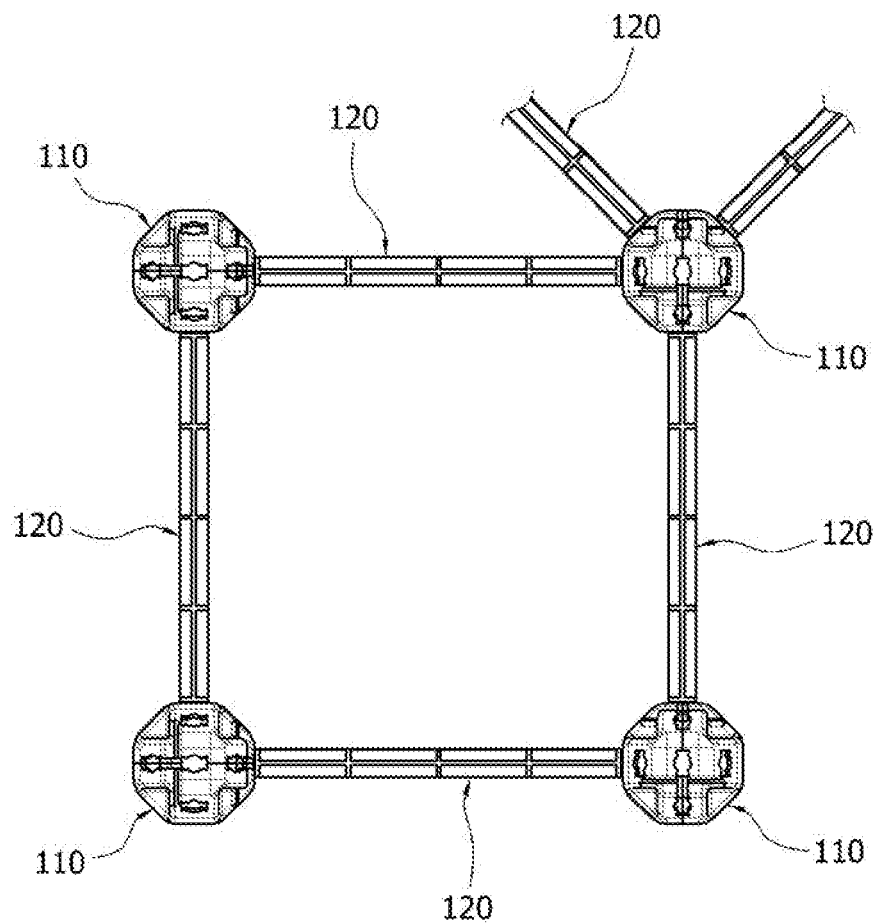
FIG. 7 is a schematic view illustrating an application of the educational construction set according to the first embodiment of the present invention.

Accordingly, as illustrated in FIG. 7, a user can realize a three-dimensional (3D) structure in a variety of shapes using the polyhedral block modules 110 and the connecting rods by simply and quickly fit and connect each of the connecting rods 120 to one of the first to third locking-holes of each of the polyhedral block modules 110 in a corresponding manner.

The outer diameter of the terminal surface 124c is defined to be greater than the inner diameter of the circular-hole. When the connecting rod is connected to the polyhedral block module, the terminal surface adjoins the quadrangular plane 111, the quadrangular slopes 112, and the vertical skirts 114 in which the first to third locking-holes 121, 122, and 123 are formed.

The extension-holes 125b and the projections 124b may be preferably configured such that the widths thereof increase outwardly. Accordingly, when the extension-holes 125b and the projections 124b are locked to each other while intersecting each other in the shape of a cross in response to the connecting rod being manipulated to rotate, this configuration can increase an area in which a greater amount of locking force for the polyhedral block module 110 can generated.

In addition, the distances T between the terminal surface and the projections may preferably be determined to be substantially the same as the thickness of the outer surfaces of the first and second section members. According to this configuration, when the connecting rod 120 is connected to the polyhedral block module 110, the terminal surface 124c can adjoin and be in tight contact with a corresponding one among the quadrangular plane 111, the quadrangular slopes 112, and the vertical skirts 114 in order to increase coupling force between the connecting rod 120 and the polyhedral block module 110.

Each of the third locking-holes 123 includes a circular-hole 125a and extension holes 125c, which are formed when open portions 114a opened outwardly in predetermined peripheral portions of the vertical skirts 114, corresponding to the fitting joint of the first and second section members 110a and 110b, are fitted to each other. The third locking-hole 123 allows the locking projection 124 of the connecting rod to be correspondingly inserted thereinto, such that, when the connecting rod is rotated, the locking projection 124 is locked to the third locking-hole 123, as in the case of the first and second locking-holes.

In addition, the connecting rod 120 is implemented as the bar member having the cross-shaped cross-section and extending a predetermined length, and is provided with joints 127 in intermediate longitudinal positions of the bar member. However, the connecting rod 120 is not limited to such illustration or description, and may have a circular cross-section or a polygonal cross-section.

In addition, when the projections 124b of the locking projection 124, provided on one or opposite ends of the connecting rod 120, have a cross-sectional shape, with the thickness thereof increasing in the direction of rotation (T1<T2), the projections 124b are correspondingly inserted into one of the first to third locking-holes. When the connecting rod is rotated in a locking direction in a position in which the terminal surface 124c adjoins one of the quadrangular plane 111, the quadrangular slopes 112, and the vertical skirts 114, close coupling force can be increased. It is accordingly possible to further increase the coupling force between the polyhedral block module and the connecting rod.

The coupling units 130 generate coupling force by which the first section member 110a and the second section member 110b are coupled to each other, so that the polyhedral block module to which the connecting rod 120 is connected can firmly remain in the assembled position, with the components thereof being fitted to each other.

Each of the coupling unit 130 may include a coupling recess 131 extending from the corresponding quadrangular slope 112 to the vertical skirts 114, in a position corresponding to the corresponding triangular connector 113, and an inner flange 132 forming the bottom surface of the coupling recess 131. A pair of inner flanges 132, adjoining each other along the fitting joint when the first and second section members 110a and 110b are fitted to each other, may respectively have a coupling-hole 132a penetrating through the corresponding inner flange 132. The coupling unit 130 may also include a coupling member fitted to the pair of inner flanges 132 through the coupling-holes 132a.

Here, the coupling member may be a fastening member, such as a bolt, or a coupling pin, fastened into the coupling-hole.

Accordingly, due to the coupling member fitted to the pair inner flanges 132 through the coupling-holes 132a, the inner flanges 132 adjoining each other along the fitting joint when fitted to each other, the first section member 110a and the second section member 110b are fitted to each other to be finally assembled into the polyhedral block module 110. On the other hand, the first section member and the second section member can be separated from each other by releasing the coupling member from the inner flanges.

Alternatively, as illustrated in FIG. 5, the coupling unit 130 may include a fitting member 135 provided between the first section member 110a and the second section member 110b. A locking-hole 135a penetrates through the fitting member 135, such that ends of the first and second reinforcement ribs 115 and 116 or ends of the first to third reinforcement ribs 115, 116, and 117 are correspondingly inserted into the locking-hole 135a.

The first and second reinforcement ribs 115 and 116 are provided with first and second open portions 115a and 116a, which are opened, such that the fitting member 135 can be fitted around the first and second reinforcement ribs 115 and 116 without interference.

In this case, the ends of the first and second reinforcement ribs 115 and 116 or the ends of the first to third reinforcement ribs 115, 116, and 117, extending from the inner surfaces of the first and second section members 110a and 110b, are correspondingly inserted into the locking-hole 135a of the fitting member 135, such that the first and second section members can remain in the coupled position, in which the first and second section members are fitted to each other, without the use of the coupling member fitted into the coupling-holes 132a of the inner flanges 132, and at the same time, the coupling force between the first and second section members can be increased.

Here, the locking-hole 135a may be provided as a through-hole such that the ends of the first to third reinforcement ribs 115, 116, and 117, which face each other when the first and second section members 110a and 110b are fitted to each other, adjoin each other through the locking-hole 135a. The locking-hole 135a may also be provided as blind holes in which an inner rib is provided, such that the ends of the first to third reinforcement ribs 115, 116, and 117, which face each other when the first and second section members 110a and 110b are fitted to each other, adjoin the inner rib. In addition, a protrusion, such as an embossed portion, may be provided on the inner surface of the locking-hole 135a to increase frictional force with respect to the ends of the first to third reinforcement ribs 115, 116, and 117 correspondingly inserted into the locking-hole 135a.

Although the fitting member 135 has been illustrated and described as being a separate fitting member disposed between the first to third reinforcement ribs of the first section member and the first to third reinforcement ribs of the second section member, which face each other, the fitting member is not limited thereto. The fitting member may be provided integrally with the first to third reinforcement ribs of the first section member or the first to third reinforcement ribs of the second section member, which face the first to third reinforcement ribs of the first section member when the first and second section members are fitted to each other.

Figure 6:
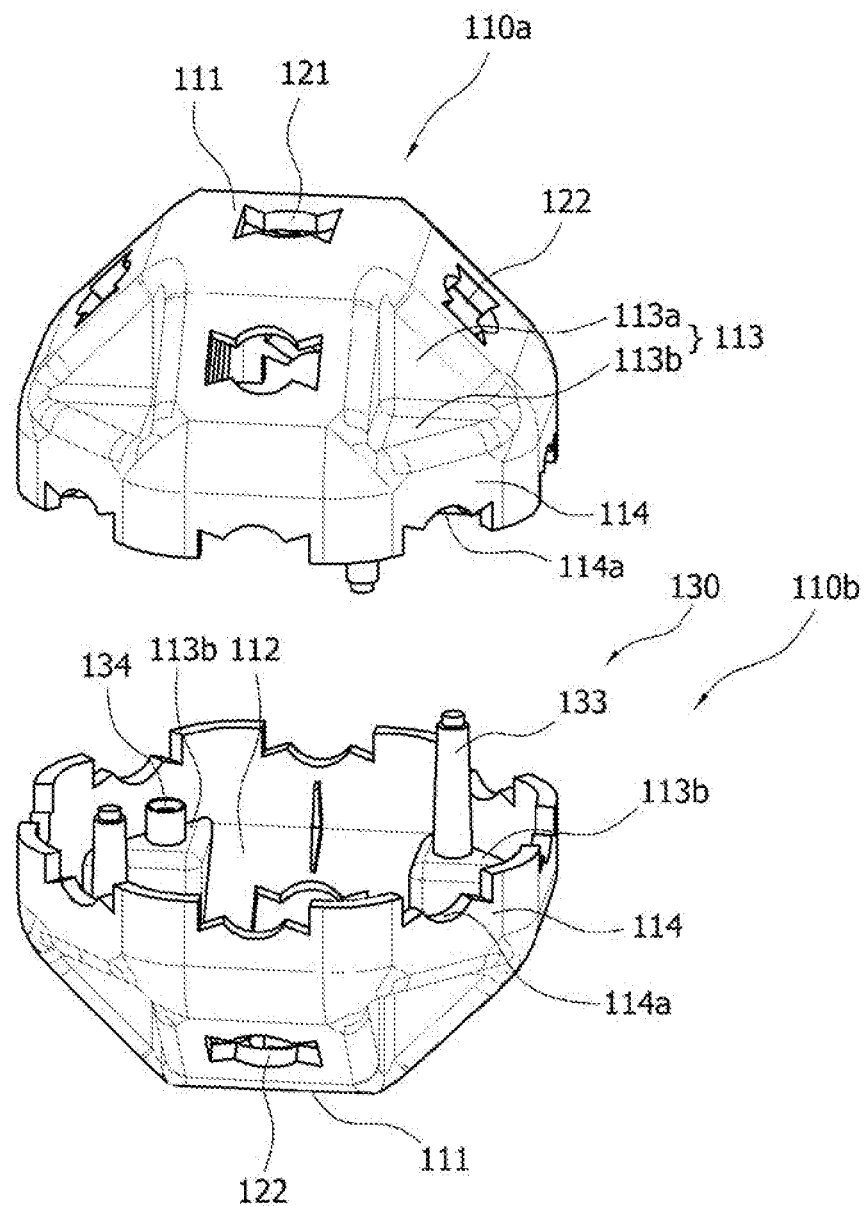
FIG. 6 is a configuration view illustrating another embodiment of the coupling units of the educational construction set according to the first embodiment of the present invention.

Alternatively, as illustrated in FIG. 6, each of the coupling units 130 may include a boss 133 extending a predetermined height from the inner surface of the triangular connector 113 provided in the first section member and a receptacle 134 provided on the inner surface of the triangular connector 113 provided in the second section member, corresponding to the triangular connector 113 of the first section member on which the boss 133 is provided. The receptacle 134 has a receptacle-recess into which the boss 133 is correspondingly inserted.

The boss 133 and the receptacle 134 may preferably be provided on the inner surfaces of the horizontal triangular walls of the triangular connectors 113 provided in the first and second section members, such that the boss 133 and the receptacle 134 face each other. The receptacle 134 may be implemented as a locking-hole penetrating through the horizontal triangular wall, such that an elastic piece provided on the end of the boss can be elastically and correspondingly inserted into and locked to the receptacle 134.

Accordingly, when the coupling unit 130 includes the boss 133 and the receptacle 134, in the assembly operation in which a technician fits the first and second section members to each other, the polyhedral block module can be finally assembled by coupling force between the boss and the receptacle as soon as the first and second section members are fitted to each other, without an operation of fitting a pair of inner flanges to each other using a separate coupling member, such as a bolt or a coupling pin. This can accordingly simplify the assembly process, and when the polyhedral block module is disassembled, a user can reassemble the polyhedral block module without a separate tool.

In addition, as illustrated in FIG. 7, a user can realize a 3D structure in a variety of shapes, as intended, by fitting the connecting rods to the polyhedral block modules, the first-stage assembly of which is completed.

Figure 8:
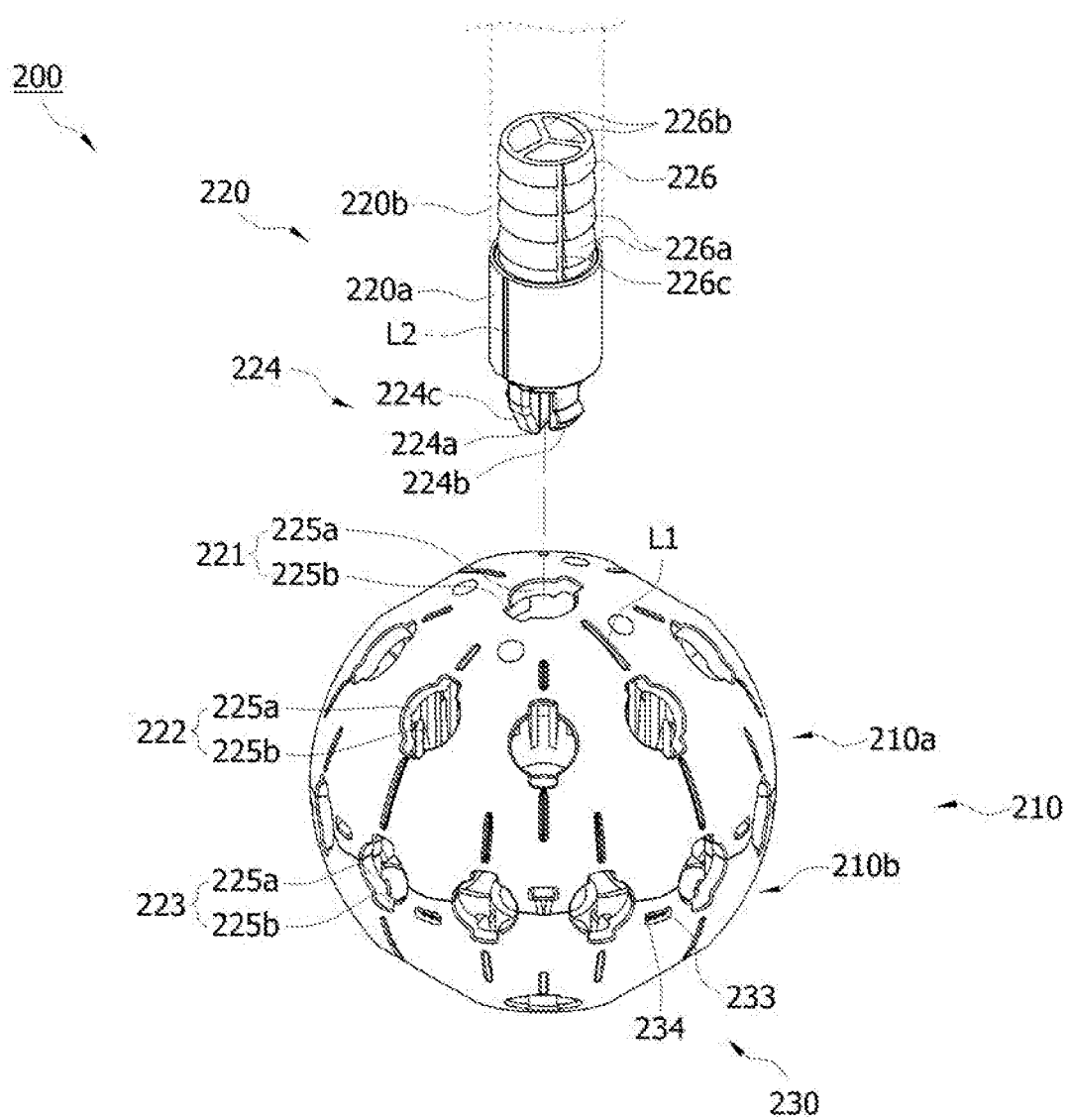
FIG. 8 is an overall perspective view illustrating an educational construction set according to a second embodiment of the present invention.

As illustrated in FIG. 8, an educational construction set 200 according to a second embodiment of the present invention may include a spherical block module 210, a connecting rod 220, and coupling units 230, as in the first embodiment.

As illustrated in FIGS. 8, 9, 11*a*, and 11*b*, the spherical block module 210 includes a first section member 210*a* and a second section member 210*b*, which are hemispherical. The first section member 210*a* and the second section member 210*b* are configured to be laterally or vertically symmetrical with respect to a fitting joint. The spherical block module 210 may be assembled into a substantially spherical structure having a spherical surface, in response to the first and second section members being fitted to each other.

Each of the first and second section members 210*a* and 210*b* is a structure having a hemispherical cross-section. Each of the first and second section members 210*a* and 210*b* has a first locking-hole 221 penetrating through a vertex of the hemispherical cross-section, a plurality of semicircular open portions 214*a* radially arranged in an outwardly-opened outer circumference 214 so as to be spaced apart from each other at predetermined distances, and a plurality of second locking-holes 222 radially provided in hemispherical surface portions between the first locking-hole 221 and the open portions 214*a* to penetrate through the hemispherical surface.

Here, in a pair of outer circumferences 214 vertically or laterally adjoining each other when the first and second section members 210*a* and 210*b* are fitted to each other, the opening portions are correspondingly fitted to each other, thereby forming third locking-holes 223, which will be described later.

In addition, each of the first and second section members 210*a* and 210*b* may include reinforcement ribs 235 reinforcing portions of the outer circumference, respectively alternating with the adjacent open portions, in order to increase the internal strength of the assembled spherical block module.

On the inner surfaces of the first and second section members corresponding to second coupling projections 233 and second coupling recesses 234, which will be described later, the reinforcement ribs 235 are provided parallel to a virtual vertical axis extending through the body of the spherical block module in the portions of the outer circumference alternating with the adjacent open portions. This configuration can reinforce the spherical block module, thereby improving endurance while preventing external impact-induced fracture.

In particular, since the reinforcement ribs 235 are provided on the portions of the outer circumference of the first and second section members corresponding to the second coupling projections 233 and second coupling recesses 234, when the second coupling projections 233 and second coupling recesses 234 are coupled, the reinforcement ribs 235 can reinforce strength while preventing deformation in the portions of the outer circumference, in which the open portions are provided.

Figure 9:
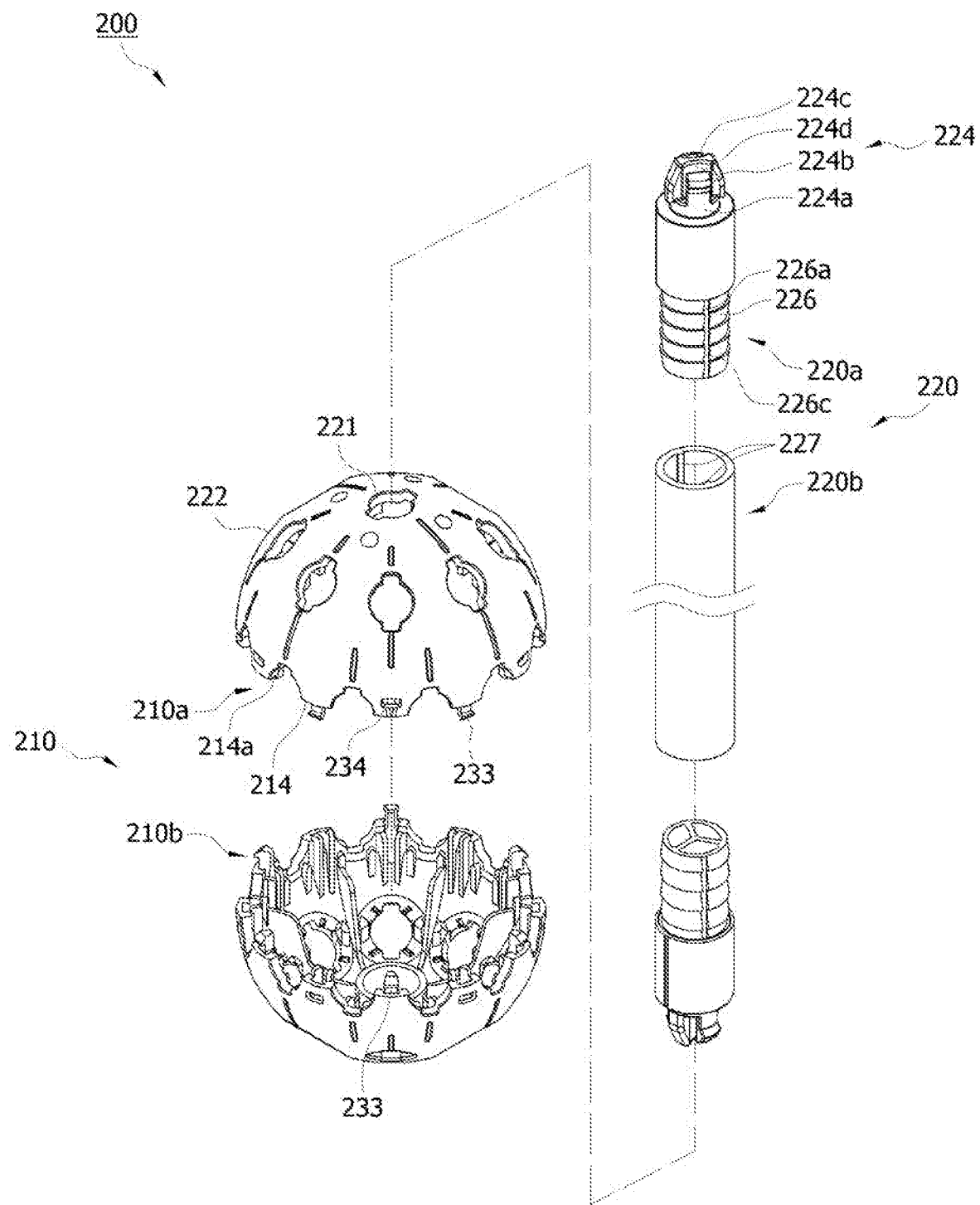
FIG. 9 is an exploded perspective view illustrating the educational construction set according to the second embodiment of the present invention.
Figure 10:
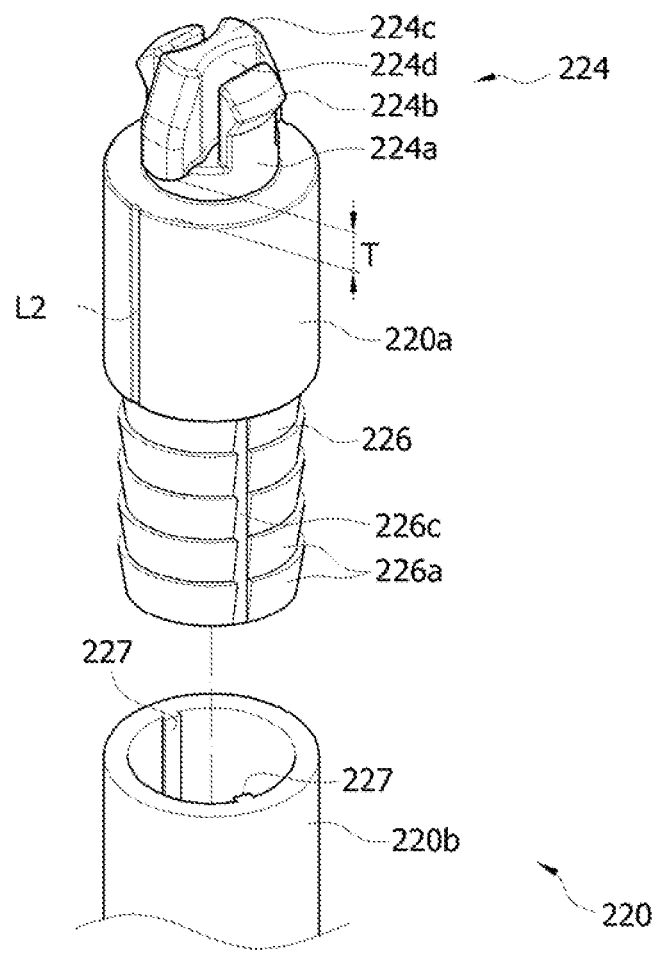
FIG. 10 is a configuration view illustrating the connecting rod of the educational construction set according to the second embodiment of the present invention.

As illustrated in FIGS. 8 to 10, the connecting rod 220 has a locking projection 224 on one or opposite ends, configured to be selectively locked to one of the first locking-holes 221 penetrating through the vertices of the first and second section members 210*a* and 210*b*, the second locking-holes 222 penetrating through the portions of the hemispherical surface between the plurality of open portions in the outwardly-open outer circumferences and the first locking-holes 221, and the third locking-holes 223 defined in the adjoined outer circumferences when the spherical block module is assembled. One end of the connecting rod 220 may be connected to the spherical block module 210 or the connecting rod 220 may connect adjacent spherical block modules 210.

Here, each of the first to third locking-holes 221, 222, and 223 includes a circular-hole 225*a* and a pair of extension-holes 225*b* extending in opposite directions from the inner surface of the circular-hole 225*a*. The locking projection 224 includes a pair of locking pieces 224*a* configured to be correspondingly inserted into the circular-hole, with hooks 224*b* protruding from the outer surface of each front end of the locking pieces 224*a* to be elastically locked to inner portions of the circular-hole. The pair of locking pieces 224*a* is elastically deformed to be bent inwards when correspondingly inserted into the circular-hole. When entrance into the circular-hole is completed, the pair of locking pieces 224*a* is elastically restored to the original positions, and the hooks 224*b* are locked to the inner portions of the circular-hole, thereby generating locking force.

In addition, a locking plate 224*c* may be provided between the pair of locking pieces 224*a* facing each other. The locking plate 224*c* can be correspondingly inserted through the pair of extension-holes 225*b* without interference, and when the connecting bar is rotated, can be locked to the inner portion of the circular-hole 225*a*, thereby generating locking force.

Here, open portions 224*d* may preferably be depressed in outer surface portions of the locking plate 224*c* corresponding to the pair of locking pieces 224*a*, in consideration of displacements of the locking pieces elastically deformed inwards when the locking projection has entered the circular-hole.

The connecting rod 220 having the above-described locking projection may include a coupling body 220*a*, with the locking projection 224 being provided on one end thereof to be selectively locked to one of the first to third locking-holes 221, 222, and 223. The connecting rod 220 may include a connecting body 220*b*, one or opposite ends of which are separably fitted to extensions 226 extending a predetermined length from the other ends of the coupling bodies 220*a*.

Here, the connecting body 220*b* may be implemented as a connecting bar member having a predetermined length, configured to be correspondingly inserted into and integrally coupled to the extension.

In addition, the extension 226 extends a predetermined length, with an outer diameter thereof being smaller than the outer diameter of the coupling body 220*a*. The connecting body 220*b* is a hollow pipe member interference-fitted around the extension, due to at least one embossed portion 226a protruding from the outer surface of the extension. However, the present invention is not limited to the above illustration and description, and the connecting body 220b may be provided as a hollow pipe member having an embossed portion protruding on an inner surface thereof.

Like the connecting body, the extension 226 may be provided as a hollow pipe member. A reinforcement rib 226b able to increase strength may be provided within the extension.

In addition, the extension 226 has linear grooves 226c into which linear locking ribs 227 protruding from the inner surface of the connecting body 220b are correspondingly inserted when the connecting body 220b is coupled to the extension 226. Coupling between the linear locking ribs and the linear grooves can prevent slipping that would otherwise occur in fitting portions between the coupling body and connecting body when the connecting rod configured to be connected to the spherical block module is manipulated to rotate.

In addition, the rear end of the locking plate 224c may be spaced apart a predetermined distance T from the terminal surface of the coupling body 220a, and the locking plate 224c may have a cross-section, the width of which gradually increases in the direction of the coupling body.

Stoppers 219 protrude from the inner surface of the spherical block module 210 having the circular-holes. When the connecting rod 220 having the locking plate correspondingly inserted into one of the first to third locking-holes is rotated, the stoppers 219 are in contact with the locking projection to prevent the connecting rod from rotating over 90°. The stoppers 219 may be provided as protrusions protruding a predetermined height between adjacent extension-holes.

In addition, auxiliary stoppers 219a may further be provided on the inner surface of the spherical block module 210 to protrude between the extension holes and the stoppers at a height smaller than the height of the stoppers.

In this case, when the locking projection 224 is rotated in a single direction after being correspondingly inserted into one of the first to third locking-holes, the locking plate 224c correspondingly inserted into the extension holes 225b may be disposed between the stoppers and the auxiliary stoppers to intersect the extension holes at an angle of about 90° or less to be locked thereto so as not to be released from the inside of the circular-hole.

Here, each of the stoppers may be provided as a protrusion having a slope inclined at a predetermined angle, such that the outer periphery of the locking plate moves upwards along the slope to bring the terminal surface of the coupling body into close contact with the outer surface of the spherical block module defining the circular-hole.

The outer diameter of the coupling body 220a is set to be greater than the inner diameter of the circular-hole, such that the terminal surface of the coupling body adjoins the outer surface of either the first or second section member in which the first to third locking-holes 221, 222, and 223 are formed.

Accordingly, a user can shape a 3D structure by simply connecting the connecting rod 220 to the spherical block module 210 by generating locking force between the locking projection 224 and the first to third locking-holes 221, 222, and 223. The shaped 3D structure can increase close contact force between the spherical block module and the connecting rod, which are locked to each other, thereby increasing coupling force to prevent external impact-induced fracture.

The distance T between the terminal surface of the coupling body and the locking plate may preferably be set to be the same as or greater than the thickness of the outer surface of either the first or second section member, such that the terminal surface of the coupling body adjoins and comes into close contact with the outer surface of either the first or second section member when the connecting rod 220 and the spherical block module are connected.

The third locking-holes 223 are defined by connection of the open portions outwardly-opened in the peripheral portions of the outer circumference, corresponding to the fitting joint between the first and second section members 210a and 210b. Each of the first and second section members 210a and 210b has a circular-hole 225a and extension holes 225b into which the locking projection 224 is correspondingly inserted and locked thereto when rotated, as in the case of the first and second locking-holes.

In addition, each of the first and second section members 210a and 210b has first indication lines L1 provided on the outer surface, corresponding to the first to third locking-holes 221, 222, and 223, and second indication lines L2 are provided on the outer surface of the coupling body 220a of the connecting rod. When the connecting rod correspondingly fitted to one of the first to third locking-holes 221, 222, and 223 is manipulated to rotate, it is possible to simply determine the locking-hole and the locking projection are locked or unlocked, depending on whether or not the second indication lines are aligned with the first indication lines.

In addition, as illustrated in FIGS. 8, 9, 11a, and 11b, the coupling units 230 generate coupling force by which the first section member 210a and the second section member 210b are coupled to each other, so that the spherical block module to which the connecting rod 120 can firmly remain in the assembled position.

Each of the coupling units 230 may include a tubular coupling body 231 extending a predetermined length from the inner surface of each of the first and second section members 210a and 210b, corresponding to the first locking-hole 221. The tubular coupling body 231 may include at least one first coupling projection 231a protruding a predetermined height from one end thereof and a first coupling recess 231b depressed in the inner surface of the tubular coupling body.

The first coupling projection 231a may be comprised of a pair of coupling plates extending the predetermined height from one end of the predetermined height, while the first coupling recess 231b may be a groove depressed in the inner surface of the tubular coupling body such that the inner surface thereof adjoins the outer surfaces of the pair of coupling plates when the first and second section members are fitted to each other.

In addition, at least one embossed portion 231c may preferably protrude from the outer surface of the first coupling plate or the inner surface of the first coupling recess to increase coupling force between the first coupling plate and the first coupling recess. The embossed portion 231c may have a cross-section, the height of which gradually increases in the direction of coupling.

In this case, when the first section member and the second section member are fitted to each other, the first coupling projection 231a protruding from one tubular coupling body may be correspondingly coupled to the first coupling recess 231b depressed in the end of the other tubular coupling body facing the one tubular coupling body, thereby allowing a single spherical block module 210 to be assembled.

In addition, in the first and second section members 210a and 210b, each of the coupling units 230 may include the second coupling projections 233 protruding from portions of the outer circumference, alternating with adjacent specific open portions, and the second coupling recesses 234 depressed in the other portions of the outer circumference, alternating with adjacent other open portions.

The second coupling projections 233 and the second coupling recesses 234 are alternatingly provided in the outer circumferential portions of the first and second section members, which are at predetermined distances from the open portions.

Each of the second coupling projections 233 may be an elastic piece having an externally-protruding hook 233*a* on the end thereof. Each of the second coupling recesses 234 may be a through-hole to be exposed from the outer surface of the outer circumference, i.e. the outer peripheral portion of either the first or second section member, such that the hook is elastically locked thereto when the first and second section members are fitted to each other.

In this case, when the first and second section members are fitted to each other, the hooks provided on the elastic pieces of the second coupling projections 233 provided on the outer circumference of the first section member can be correspondingly elastically coupled to the through-holes of the second coupling recesses provided in the outer circumference of the second section member facing the first section member, so that a spherical block module can be assembled due to coupling between the hooks and the through-holes.

Figure 11A:
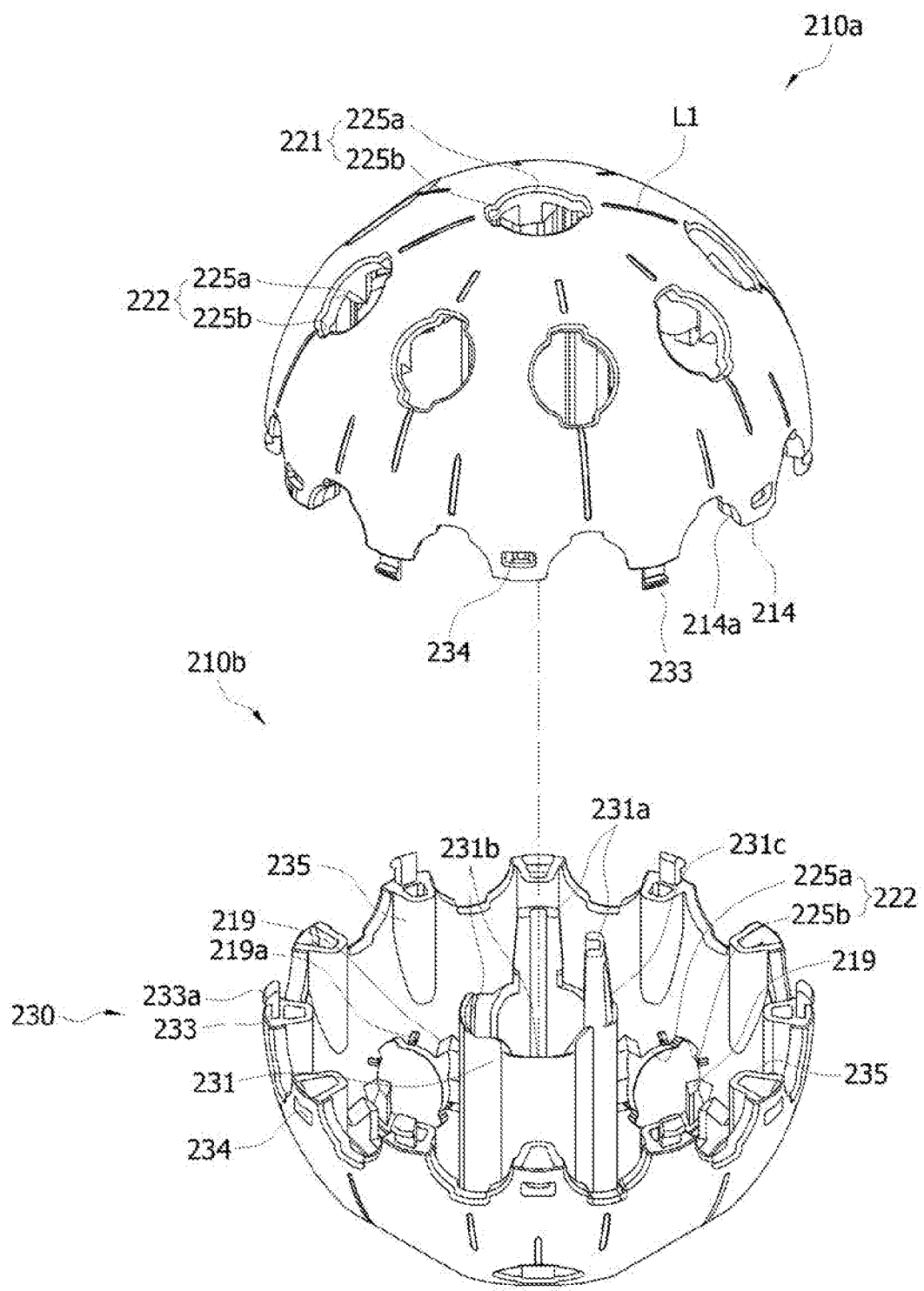
FIG. 11*a* is a configuration view illustrating the first and second section members of the educational construction set according to the second embodiment of the present invention, in which first and second coupling projections are applied.
Figure 11B:
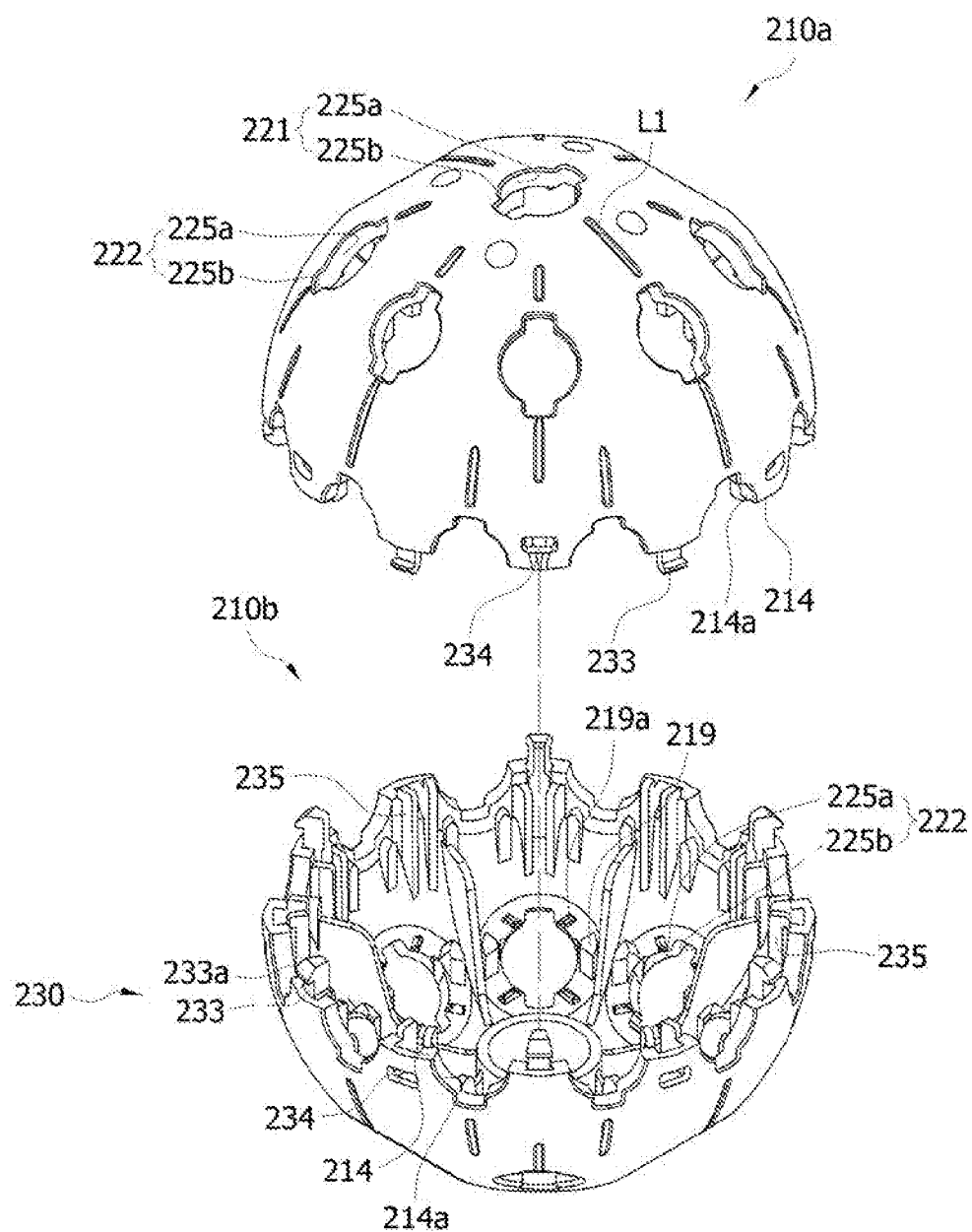
FIG. 11*b* is a configuration view illustrating the first and second section members of the educational construction set according to the second embodiment of the present invention, in which first and second coupling recesses are applied.
Figure 12A:
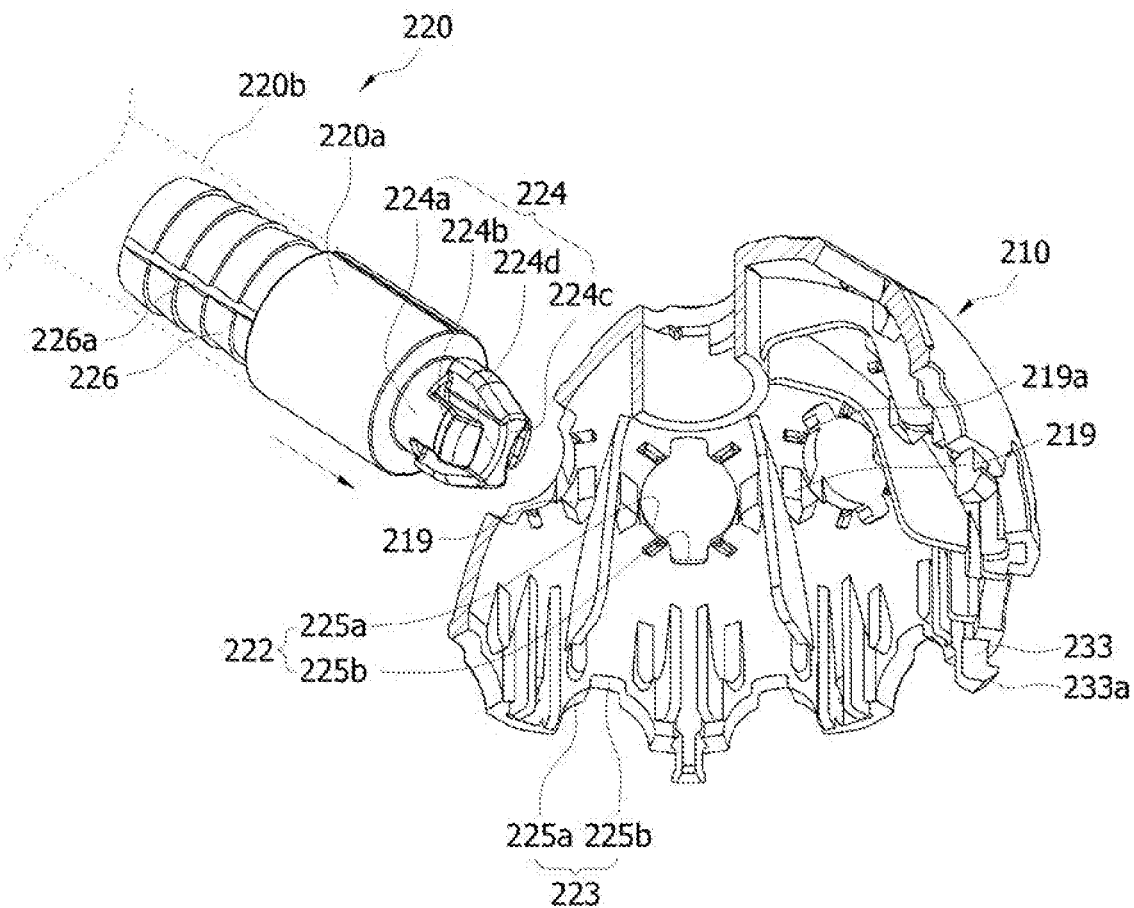
FIG. 12*a* illustrates the locking projection correspondingly inserted into the second locking-hole.
Figure 12B:
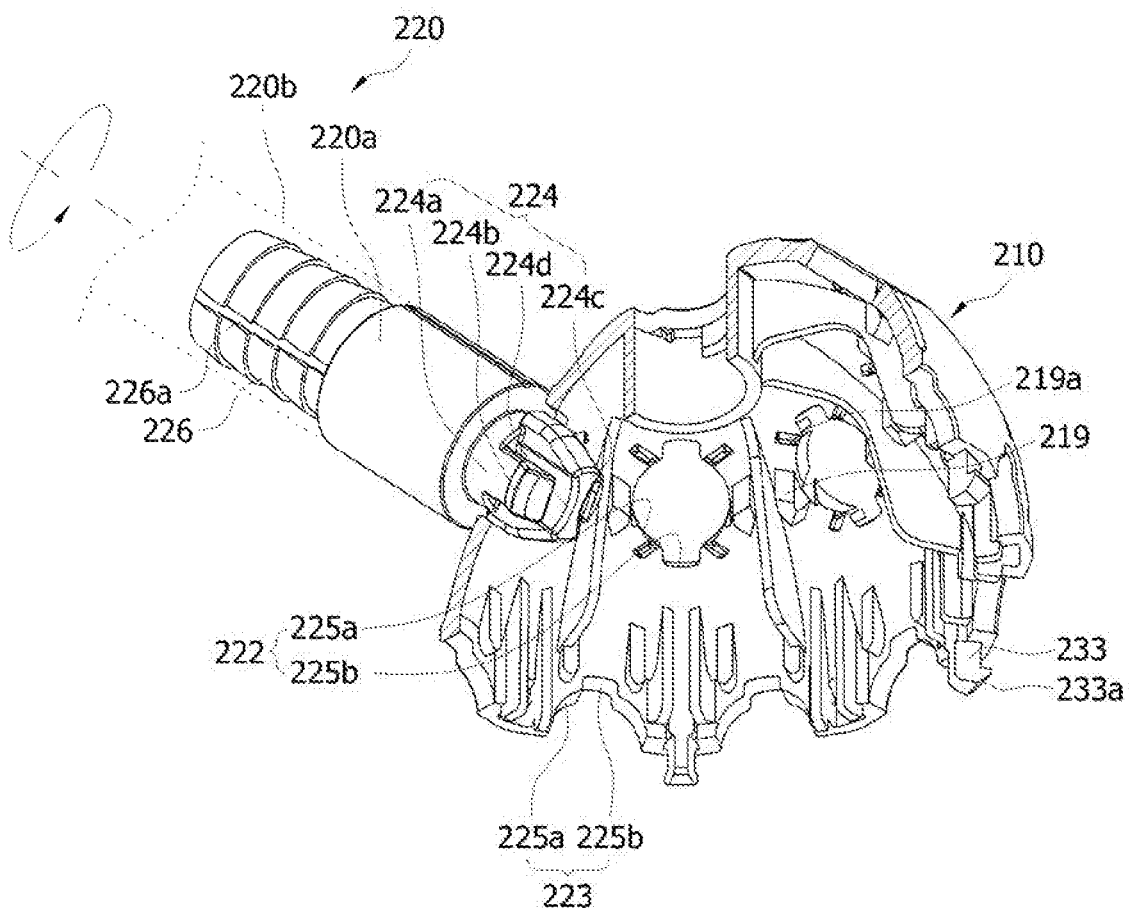
FIG. 12*b* illustrates rotation of the locking projection correspondingly inserted into the second locking-hole.
Figure 12C:
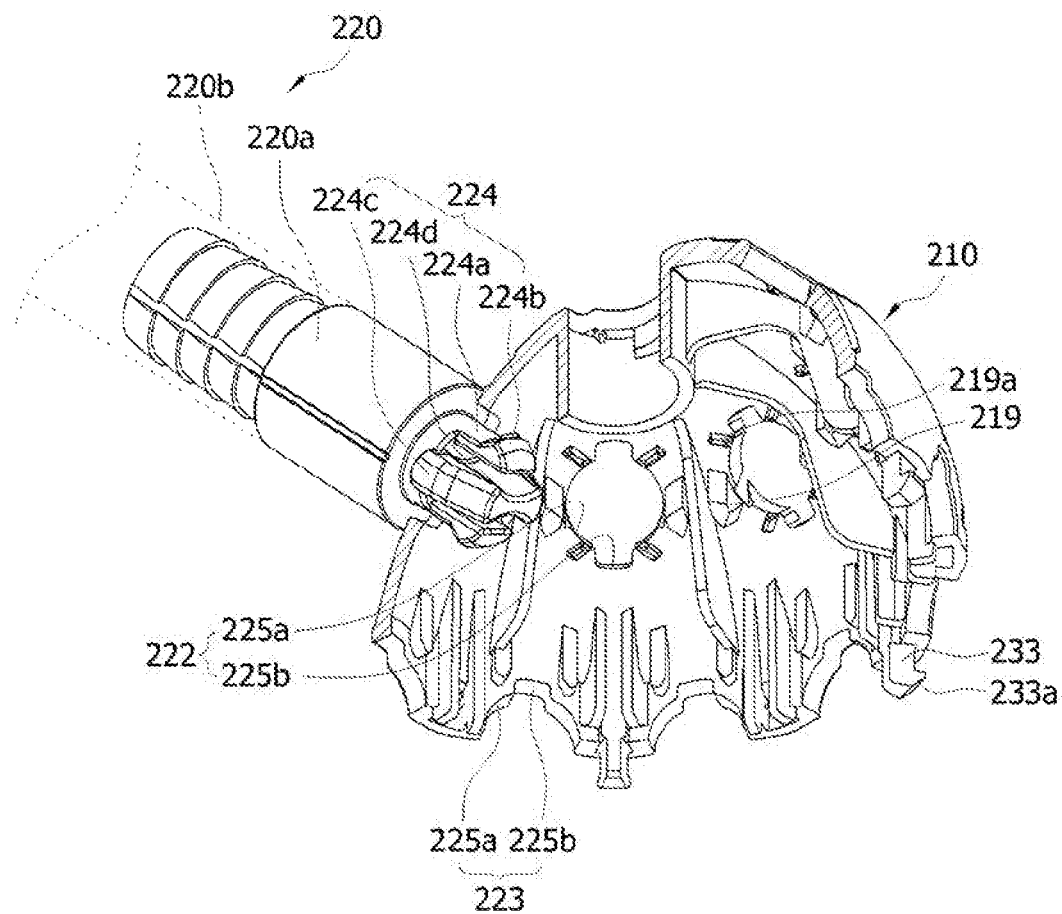
FIG. 12*c* illustrates the locking projection correspondingly inserted into the first locking-hole.

Accordingly, as illustrated in FIG. 11*a*, the coupling units 230 may include the first coupling projections and the first coupling recesses of the tubular coupling bodies, configured to be coupled to the corresponding components in the central portions of the first and second section members, thereby generating coupling force. Alternatively, as illustrated in FIG. 11*b*, the coupling units 230 may include the second coupling projections and the second coupling recesses configured to be coupled to the corresponding components in the circumferential portions of the first and second section members, thereby generating coupling force. The first and second coupling projections and the first and second coupling recesses may be concurrently or selectively provided in the central portions or the outer circumferences, allowing the first and second section members to be fitted to each other.

In addition, an operation in which a mechanic assembles the spherical block module by fitting the first and second section members to each other can be simply performed via mutual coupling between the first and second coupling projections and the first and second coupling recesses without a separate coupling member or tool, such as a bolt or a coupling pin. Accordingly, the assembly process can be simplified.

Figure 13:
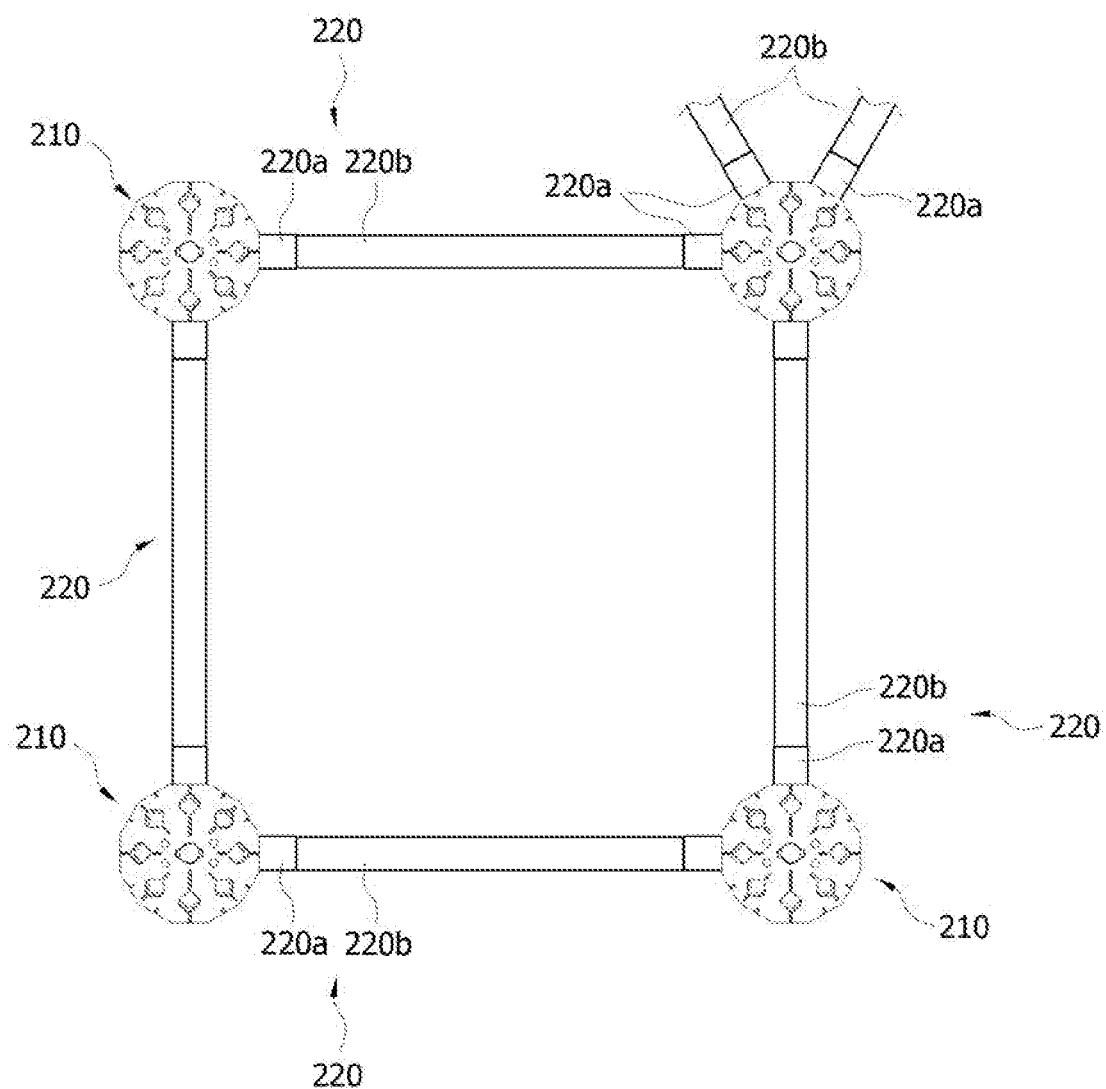
FIG. 13 is a configuration view illustrating an application of the educational construction set according to the second embodiment of the present invention.

As illustrated in FIG. 13, a user can realize a 3D structure in a variety of shapes, as intended, by fitting the connecting rods to the spherical block modules, the first-stage assembly of which is completed.

Although the exemplary embodiments of the present invention have been described for illustrative purposes, those skilled in the art will appreciate that various substitutions, modifications, and changes are possible, without departing from the scope and spirit of the present invention as disclosed in the accompanying claims.

The invention claimed is:

1. An educational construction set, comprising:
 a spherical block module comprising a first section member and a second section member and configured to be assembled by fitting of the first section member and the second section member facing each other, wherein each of the first and second section members has a first locking-hole penetrating through a vertex of a hemispherical cross-section of the spherical block module, a plurality of open portions provided in an outwardly-opened outer hemispherical circumference of the spherical block module, and a plurality of second locking-holes penetrating through outer portions between the first locking-hole and the open portions;
 a connecting rod having a predetermined length, and comprising a locking projection on opposite ends thereof, the locking projection being selectively locked to one locking-hole selected from the group consisting of the first locking-hole, the second locking-holes, and third locking-holes, wherein the third locking-holes are defined by connection of the open portions facing each other, wherein the connecting rod is connected to the spherical block module or is connected between an adjacent spherical block modules; and
 a coupling unit generating coupling force for coupling the first section member and the second section member to each other, so that the spherical block module remains in an assembled position, wherein
 the connecting rod comprises a coupling body, with the locking projection being provided only on one end of the coupling body to be selectively locked to one locking-hole among the first to third locking-holes, and a connecting body, one or opposite ends of the connecting body are separably fitted to a segmented extension extending from other ends of the coupling body, a linear locking rib protruding from an inner surface of the connecting body, and each segment of the extension extends from the extension by a second predetermined length, with an outer diameter smaller than an outer diameter of the coupling body, and the connecting body is interference-fitted around the extension by a plurality of embossed portions that extend, spaced apart, along a length of the cylindrical portion of the segmented extension, and protruding from an outer surface of the extension and the linear locking rib of the connecting body slides into a linear groove formed through the embossed portion.

2. The educational construction set according to claim 1, wherein the one locking-hole is a circular-hole and the educational construction set further comprises a pair of extension-holes provided in opposite directions around the circular-hole,
 the locking projection comprises a pair of locking pieces respectively having a hook protruding from an outer surface of a front end thereof, the hook being inserted into the circular-hole to be elastically locked to an inner portion of the circular-hole, and a locking plate provided between the pair of locking pieces to be correspondingly inserted through the pair of extension-holes, the locking plate being locked to an inner portion of the circular-hole when a connecting bar is rotated.

3. The educational construction set according to claim 2, wherein a stopper is provided on an inner surface of the spherical block module in which the circular-hole is provided, the stopper adjoining the locking plate to limit rotation of the connecting rod when the connecting rod is rotated.

4. The educational construction set according to claim 1, wherein the coupling unit comprises tubular coupling bodies extending by a third predetermined length from inner surfaces of the first and second section members, corresponding to the first locking-holes, wherein, first coupling projections protruding from ends of the tubular coupling bodies in one section member from the first section member and the second section member facing each other are correspondingly coupled to first coupling recesses depressed in the tubular coupling bodies in the other section member from the first section member and the second section member facing each other when the first and second section members are fitted to each other.

5. The educational construction set according to claim 4, wherein the first coupling projections comprise coupling plates extending by a predetermined height, and the first coupling recesses comprise grooves depressed in inner surfaces of the tubular coupling bodies to adjoin outer surfaces of the coupling plates.

6. The educational construction set according to claim 1, wherein the coupling unit comprises second coupling projections protruding from the outer circumferences of the first and second section members and second coupling recesses depressed in the outer circumferences of the first and second section members, corresponding to the adjacent open portions, the second coupling projections provided on predetermined portions of the outer circumferences being correspondingly coupled to the second coupling recesses provided on the other portions of the outer circumferences.

7. The educational construction set according to claim 6, wherein each of the second coupling projections comprises an elastic piece having an externally-protruding hook on one end thereof, and each of the second coupling recesses comprises a through-hole penetrating through an outer surface of either the first or second section member, such that the hook is elastically locked thereto.

8. The educational construction set according to claim 6, wherein reinforcement ribs are provided on inner surfaces of the first and second section members, corresponding to the second coupling projections or the second coupling recesses, to reinforce portions of the outer circumferences alternating with the adjacent open portions.

9. The educational construction set according to claim 1, wherein the embossed portion provides circumferential ridges that are intersected by the linear groove.

10. The educational construction set according to claim 9, wherein the linear groove extends the length of the extension.

* * * * *